United States Patent
Etemad

(10) Patent No.: US 8,588,139 B2
(45) Date of Patent: Nov. 19, 2013

(54) MAC/PHY IDENTIFICATION OF BASE STATION TYPES AND THEIR PREFERRED AND RESTRICTED ACCESS

(75) Inventor: Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 12/820,966

(22) Filed: Jun. 22, 2010

(65) Prior Publication Data

US 2011/0044244 A1 Feb. 24, 2011

Related U.S. Application Data

(60) Provisional application No. 61/275,266, filed on Aug. 24, 2009.

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| 2006/0121903 | A1 | 6/2006 | Lee et al. |
| 2009/0154386 | A1 | 6/2009 | So et al. |
| 2009/0252073 | A1* | 10/2009 | Kim et al. ...................... 370/311 |
| 2009/0305699 | A1* | 12/2009 | Deshpande et al. .......... 455/434 |
| 2009/0312024 | A1* | 12/2009 | Chen et al. .................... 455/437 |
| 2010/0153816 | A1* | 6/2010 | Li et al. ......................... 714/758 |
| 2010/0309849 | A1* | 12/2010 | Park et al. ..................... 370/328 |

FOREIGN PATENT DOCUMENTS

| EP | 1860455 A1 | 11/2007 |
| EP | 1890442 A2 | 2/2008 |

OTHER PUBLICATIONS

Shrivastava et al., "Group Resource Allocation Techniques for IEEE 802.16M", filed on Dec. 31, 2009.
International Search Report and Written Opinion received for PCT Patent Application No. PCT/US2010/046439, mailed on Feb. 1, 2011, 10 pages.

* cited by examiner

*Primary Examiner* — Yong Zhou
(74) *Attorney, Agent, or Firm* — Schwabe, Williamson & Wyatt, P.C.

(57) ABSTRACT

Embodiments of a system and methods for identification of base station types are generally described herein. Other embodiments may be described and claimed.

20 Claims, 6 Drawing Sheets

MAC/PHY IDENTIFICATION OF BASE STATION TYPES AND THEIR PREFERRED AND RESTRICTED ACCESS

CLAIM OF PRIORITY

The present application claims priority to provisional application 61/275,266 filed Aug. 24, 2009, which is incorporated by reference in its entirety.

FIELD OF THE INVENTION

This application relates to wireless systems and, more particularly, to identification of base station types in a wireless network.

BACKGROUND

WiMAX, or WiMAX-I, is based on the IEEE (Institute of Electrical and Electronics Engineers) 802.16e standard. WiMAX-I employs orthogonal frequency division multiple access (OFDMA) for transmissions, resulting in improved multi-path performance in non-line-of-sight environments. WiMAX-I may employ single user (SU) or multiple user (MU) multiple input multiple output (MIMO) antenna techniques, adaptive modulation and coding schemes. A new generation of WiMAX, termed 802.16m or WiMAX-II is currently being developed.

BRIEF DESCRIPTION OF THE DRAWINGS

The present invention is illustrated by way of example and not as a limitation in the figures of the accompanying drawings, in which.

DETAILED DESCRIPTION

Figure 1:
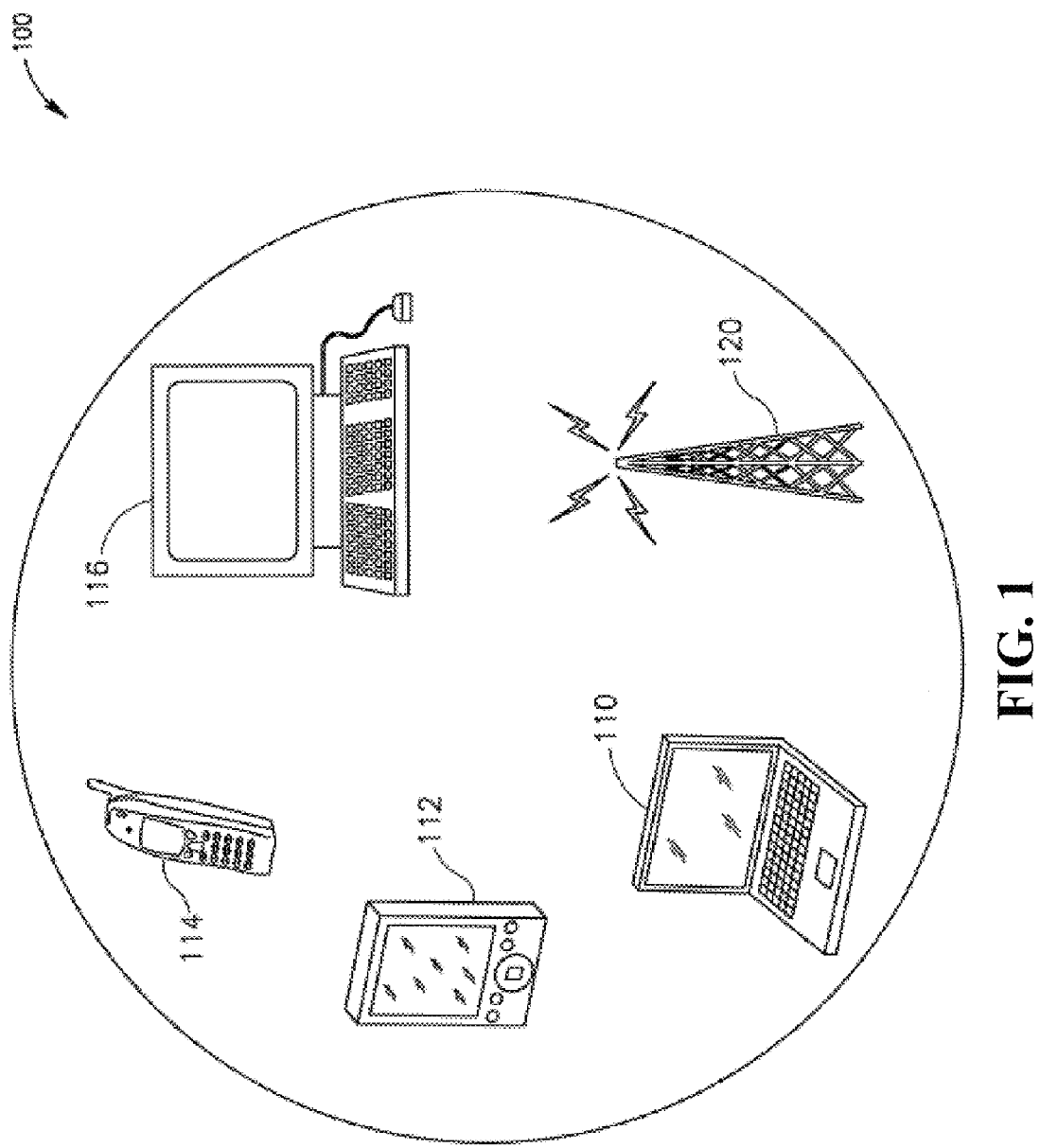
FIG. 1 is a schematic illustration of a wireless network according to some embodiments.

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the invention in relation to preferred and/or restricted access of multi-layer wireless networks using base station identifiers. Further, while example embodiments are described herein in relation to multi-layer networks the invention is not limited thereto and can be applied to other types of wireless networks including single layer wireless networks. Wireless networks specifically include, but are not limited to, wireless local area networks (WLANs) and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, advanced mobile stations (AMS), base stations, advanced base stations (ABS), access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Access or handover in a wireless network or multi-layer network may be triggered based upon a single parameter type, such as a radio channel condition. It would be an advance in the art to provide a system and methods for accessing a wireless network or wireless networks in a multi-layer network using base station identifiers to provide information about a base station type and/or a type of network associated with the one or more base stations. The information correlating to the base station type may be identified using one or more medium access control (MAC) layer and/or a physical (PHY) layer identifiers. The identifiers can provide insight into preferred and/or restricted access to one or more wireless networks.

Reference is made to FIG. 1, which schematically illustrates a wireless network 100 according to an embodiment of the present invention. Wireless network 100 may include a base station (BS) 120, and one or more platforms, subscriber, mobile, advanced mobile, or other stations 110, 112, 114, and/or 116, which may be for example mobile or fixed mobile stations. In some embodiments, base station 120 may be referred to as an advanced base station (ABS), access point (AP), terminal, and/or node, and stations 110, 112, 114, and/or 116 may be referred to as a station (STA), mobile STA (MS), advanced MS (AMS), platform, terminal, and/or node. However, the terms base station and mobile station are used merely as an example throughout this specification and their denotation in this respect is in no way intended to limit the inventive embodiments to any particular type of network or protocols.

Wireless network 100 may facilitate wireless access between each of mobile stations 110, 112, 114, and/or 116 and base station 120. For example, wireless network 100 may be configured to use one or more protocols specified in by the Institute of Electrical and Electronics Engineers (IEEE) 802.11 ™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Corl2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.162004/Corl-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1, although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3rd Generation Partnership Project (3GPP), Fourth Generation (4G), Long Term Evolution (LTE) cellular network or any protocols for WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, base station 120 may manage and/or control wireless communications among mobile stations 110, 112, 114, and/or 116 and between mobile stations 110, 112, 114, and/or 116 and base station 120. Mobile stations 110, 112, 114, and/or 116 may, in turn, facilitate various service connections of other devices (not shown) to wireless network 100 via a private or public local area network (LAN), although the embodiments are not limited in this respect.

Figure 2:
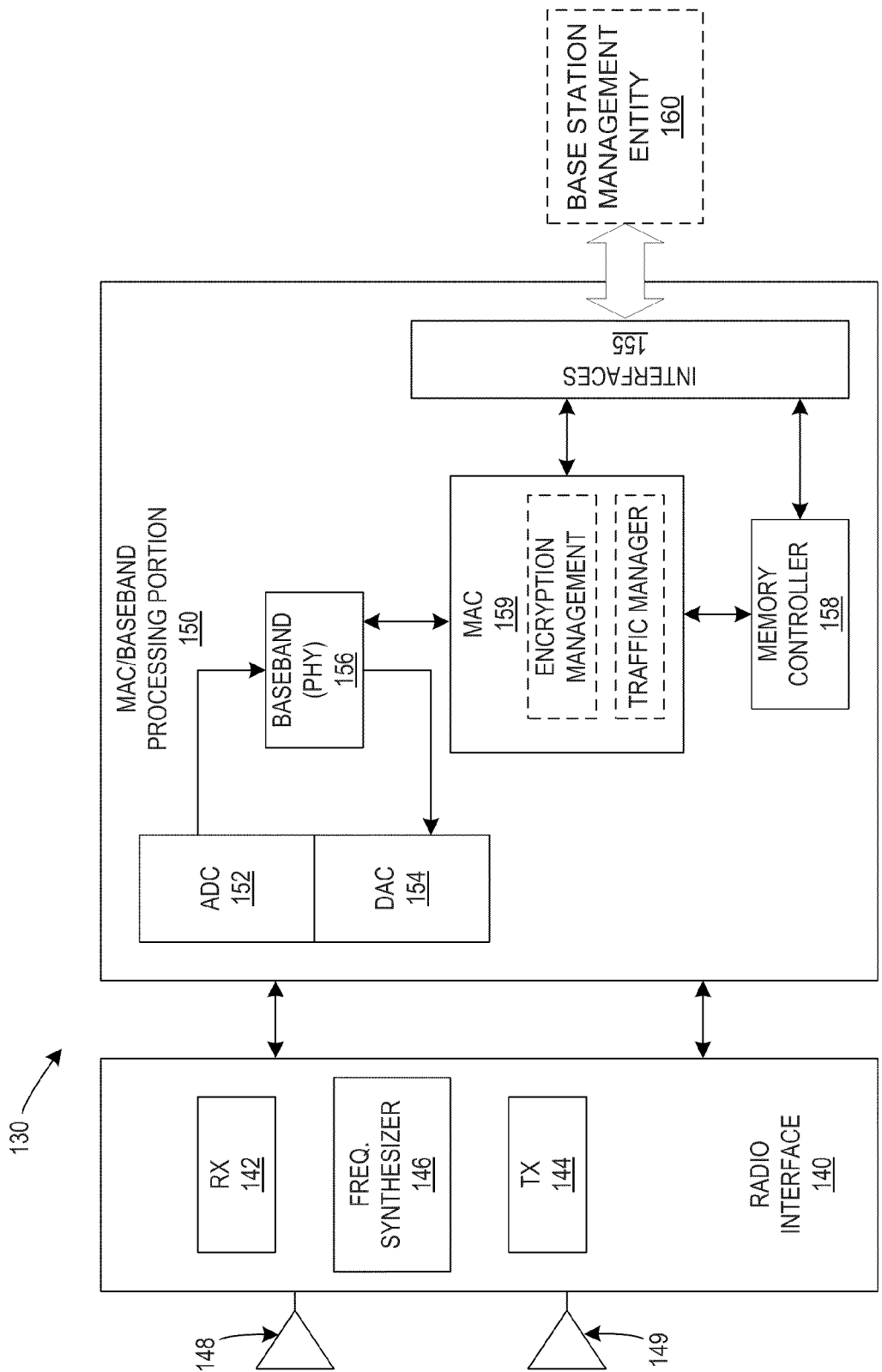
FIG. 2 is a schematic illustration of an apparatus for use in a wireless network according to some embodiments.

Reference is made to FIG. 2, which schematically illustrates an apparatus 130 for use in a wireless network according to an embodiment of the invention. For example, apparatus 130 may be a station, platform, terminal, device, or node (e.g., one of mobile stations 110, 112, 114, and/or 116, and base station 120, described in FIG. 1) for communicating with other platforms, terminals, devices, or nodes, in a wireless network (e.g., wireless network 100, described in FIG. 1). Apparatus 130 may include a controller or processing circuit 150 including logic (e.g., including hard circuitry, processor and software, or a combination thereof). In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs, an expansive description thereof is omitted.

Processing circuit 150 may communicate with RF interface 140 to process receive and/or transmit signals and may include, for example, an analog-to-digital converter 152 for down converting received signals, a digital-to-analog converter 154 for up converting signals for transmission. Further, processing circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames. Alternatively or in addition, MAC processing circuit 159 may share processing for certain of these functions or perform these processes independent of PHY processing circuit 156. In some embodiments, MAC and PHY processing may be integrated into a single circuit if desired.

Apparatus 130 may be, for example, a base station, an advanced base station, an access point, a subscriber station, a platform, a mobile station or advanced mobile station, a device, a terminal, a node, a hybrid coordinator, a wireless router, a NIC and/or network adaptor for computing devices or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of station 130 may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit.".

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
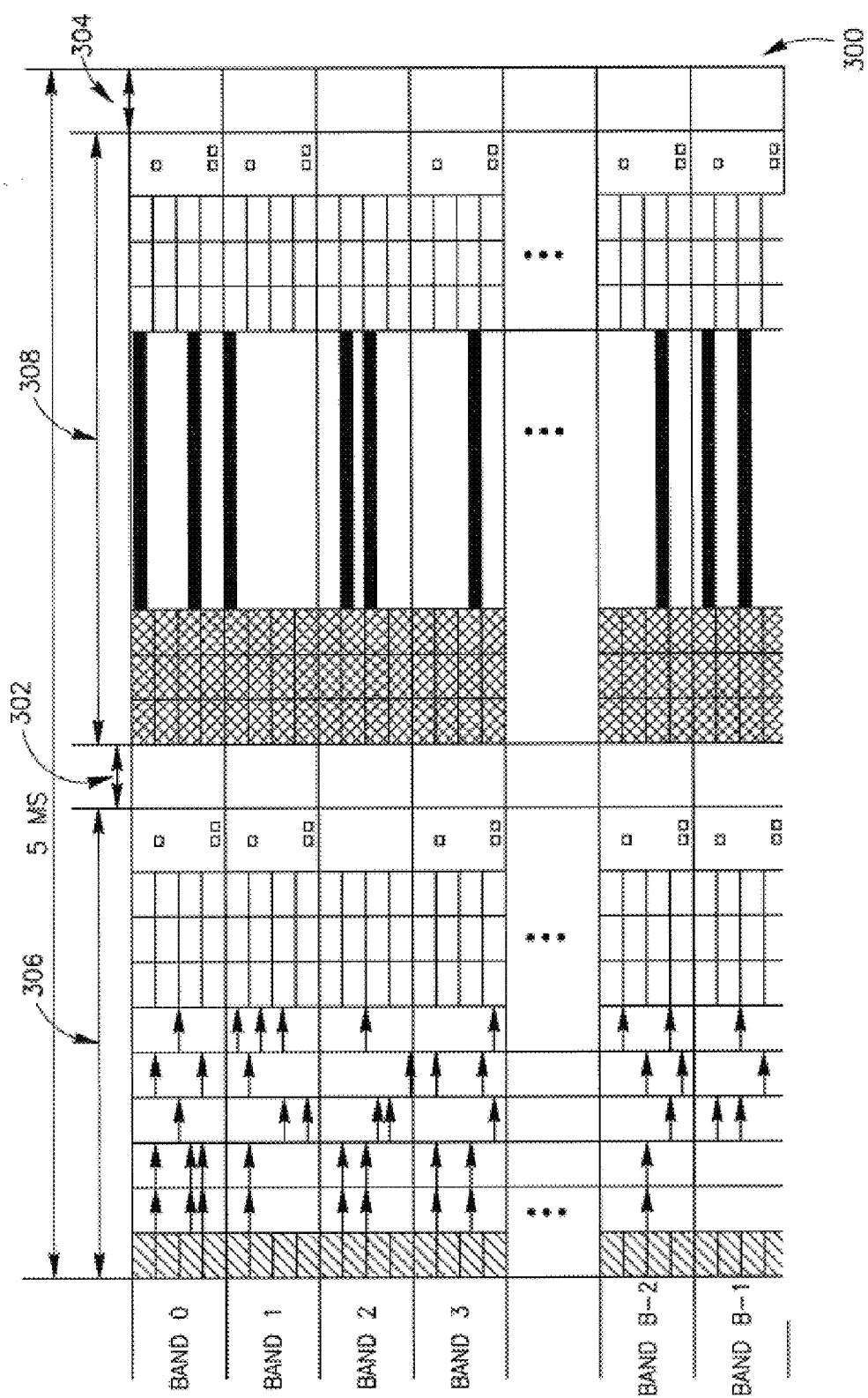
FIG. 3 is a schematic illustration of a frame structure according to some embodiments.

Reference is made to FIG. 3, which schematically illustrates a frame 300 structure according to an embodiment of the invention. Frame 300 (e.g., a radio frame) may be a portion of a transmitted and/or received communication in a wireless network 100 or a multi-layer wireless network as described later in reference to FIG. 4. In some embodiments, frame 300 may describe a periodically repeating segment structure of a larger communication signal or stream. In some embodiments, repeating frame 300 may include substantially different information, for example, during substantially each separate transmission. Frame 300 may be defined and may include broadband wireless access technology according to, for example, the IEEE Std 802.16-2009 or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE Std 802.16-2009 specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

In some embodiments, the TTI or the duration of frame 300 may be, for example, approximately 5 ms. A round trip time (RTT) (e.g., the time interval between two consecutive pre-scheduled DL transmissions 306 to a specific wireless node may be, for example, approximately 10 ms. Wireless networks (e.g., wireless network 100) having rapidly changing channel conditions and/or small coherence times (e.g., rapidly moving mobile stations or nodes, such as automobiles having vehicular speeds of, for example, in the excess of approximately 120 kilometers per hour (km/h)) may use mechanisms for supporting substantially high mobility in varying channel conditions. Embodiments of the invention may support wireless network 100 having substantially small round trip times, for example, to enable substantially fast-varying channel condition feedback between mobile stations 110, 112, 114, and/or 116 and base station 120. Other time durations may be used.

The current IEEE Std 802.16-2009 specification standard frame structure may include restrictions, such as substantially long TTIs that are typically not suitable for supporting substantially fast feedback and low access latency (e.g., less than 10 ms), which may be used by, for example, emerging radio access technologies.

Embodiments of the present invention may include or use a modified version of the frame 300 structure for supporting lower latency operations, while maintaining backward compatibility, for example, to the IEEE Std 802.16-2009 specification frame structure. Frame 300 structure may be used, for example, in the next generation of mobile WiMAX systems and devices (e.g., including the IEEE 802.16m standard). In some embodiments, frame 300 structure or portions thereof may be transparent to the legacy terminals (e.g., which operate according to mobile WiMAX profiles and IEEE Std 802.16-2009) and may be used only for communication between BSs, mobile stations, and/or MSs that both operate based on the IEEE 802.16m standard.

According to embodiments of the invention, the frame structure may include synchronization and broadcast channels and the mobile stations may have to parse or decode the common control channel (e.g., media access protocol (MAP) frame portion) for acquiring system configuration information to determine uplink (UL) and downlink (DL) allocations.

Figure 4:
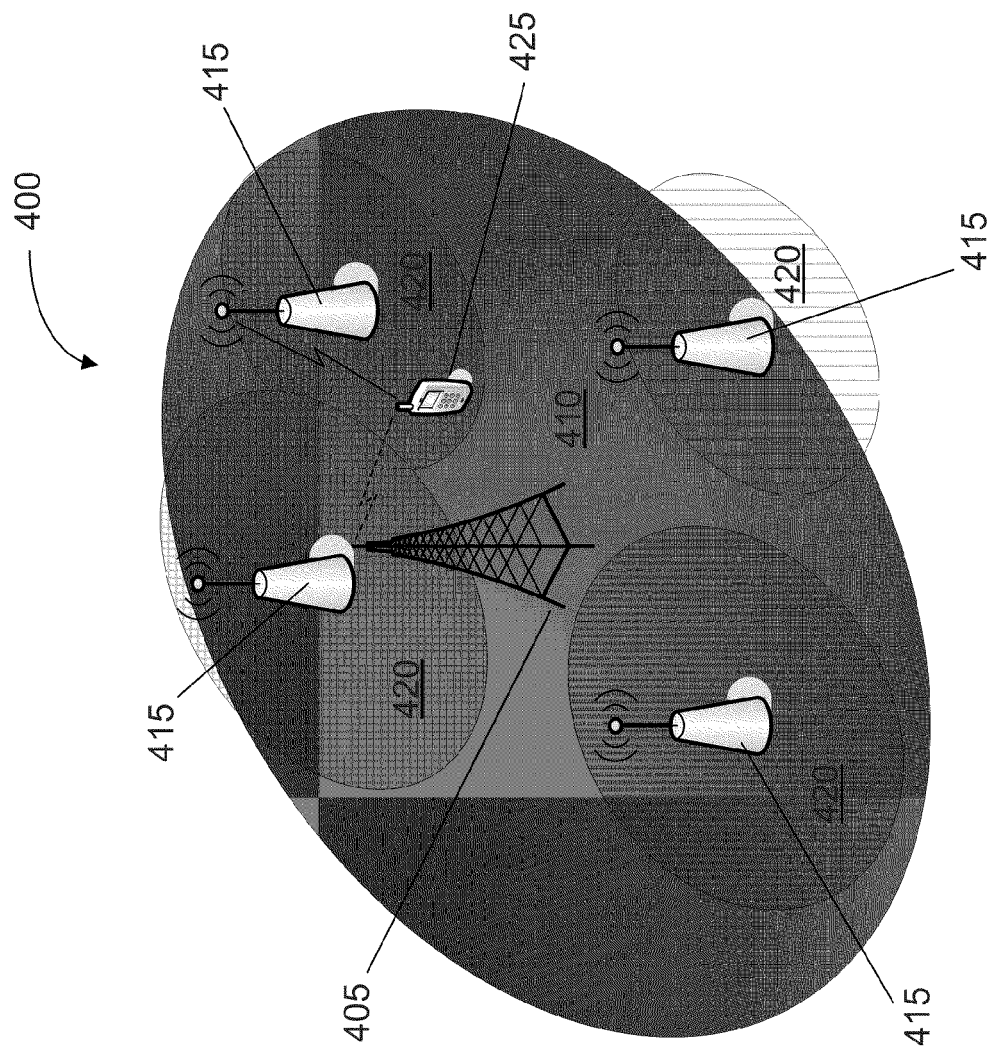
FIG. 4 is a diagram illustrating a mobile station (MS) communicating with cells in a multi-layer network according to some embodiments.

In reference to FIG. 4, a diagram of a mobile station (MS) or advanced MS (AMS) 425 communicating with cells in a multi-layer network 400 is illustrated according to some embodiments. It would be helpful to provide one or more parameters or other indicia to advertise or otherwise provide cell type information to the AMS 425. Without use of these parameters or other indicia, base stations may be treated as if they are a commonly positioned on the same layer, which may lead to access and handover decisions being made upon radio channel conditions. Mechanisms to provide mobile stations such as the AMSs 425 with information regarding base station types in the multi-layer network 400 through broadcast channels or messages and with procedures or methods which each AMS 425 is to apply in attempting to access and handover between cells in the multi-layer network 400 can supply cell type information to the AMS 425.

Network access and handover decisions in the multi-layer network 400 can be based at least in-part on information pertaining to available base station type(s), wherein information regarding the types of base stations available is provided using broadcast channels or messages and associated protocol or procedures to be used which the AMS 425 should apply when attempting to access or handover between cells. In the embodiment illustrated in FIG. 4, the multi-layer network 400 comprises one or more macro advanced, base stations (ABS) 405 each deploying a macrocell 410 wherein each macro ABS 405 corresponds to a carrier. Each carrier may be categorized with a designated type and ABS 405 types may be categorized according to parametric identifiers such as cell size, access type, and network synchronization status.

The macro ABS 405 may be a public base station deployed by a service provider and operated on a service provider backhaul that supports an advanced air interface protocol as described in IEEE 802.16m in the macrocell 410. The macrocell 410 may overlap, in whole or in part, one or more other macrocells 410 and non-macro ABSs 415 deploying non-macro cells 420 in the multi-layer network 400. Each non-macro ABS 415 may be a pico or femto ABS that operates with a relatively lower transmit power, as compared to the macro ABS 405, in a licensed spectrum and may use the same or different frequency as the macro ABS 405. In this embodiment, the macro ABS 405 and each non-macro ABS 415 are neighboring base stations, though the embodiment is not so limiting. Additional base stations (not shown), including base stations outside the macrocell 410 may be neighboring base stations.

The non-macro ABS 415 may be connected to the same service provider network as the macro ABS 405 using one or more wired or wireless connections. Other cell types in the multi-layer wireless network 400 may comprise microcells or partially configured carriers that support downlink (DL) only carriers, as indicated in a primary preamble. Additionally, one or more relay stations (not shown) or advanced relay stations (ARS) supporting the advanced air interface protocol may also be located in the multi-layer network 400. The ARSs transmit and receive signals to and from a serving base station such as the macro ABS 405 or the non-macro ABS 415 and/or to other relay stations and/or to mobile stations to improve the quality of communication to the mobile stations located in areas near an edge or boundary of a cell coverage area. Depending on a location in a cell, a given AMS 425 may be associated to the serving base station or one or more of the relay stations.

The non-macro ABSs 415 may be femto ABSs configured to serve users in a Closed Subscriber Group (CSG) or an Open Subscriber Group (OSG), though the embodiment is not so limited. In an embodiment, the CSG is a set of subscribers authorized by the non-macro ABS 415 owner or network service provider. Each non-macro ABS 415 may be a femto ABS serving CSGs, wherein each ABS 415 is a CSG Closed Femto ABS or a CSG Open Femto ABS. Each CSG Closed Femto ABS may be a private ABS accessible only to AMSs 425 in the CSG except for mobile stations, such as the AMS 425, that need access to emergency services subject to regulation requirements. Each CSG Open Femto ABS may be a semi-private ABS that is primarily accessible to AMSs 425 belonging to the CSG of the CSG Open Femto ABS. Other AMSs 425 outside the CSG may access the CSG Open Femto ABS, but may be served according to a lower priority. The non-macro ABS 415 serving the OSG is a public non-macro ABS 415 accessible to any AMS 425.

Access systems such as WiMAX and other broadband access systems may be expected to support multi-layer networks 400 in which an AMS 425 access to each layer in the multi-layer network 400, such as the macrocell 410 and non-macrocells 420 should be optimized not only based on radio channel conditions and traffic loads or traffic types, but also on some logically defined preferences and restrictions. An air interface protocol should limit a need for the AMS 425 scanning, cell selection and reselection, access for network entry, re-entry, and handover to a non-macro ABS 415, such as a femto ABS with restricted access if the AMS 425 is designated as part of a CSG of the femto ABS. Further, the air interface protocol should support preferred access, during handover and power saving operations of the AMS 425 to femto ABSs. Access and handover to macro ABS 405 and non-macro ABS 415 may be determined and/or optimized based on a mobility speed of the AMS 425.

In an embodiment, higher speed AMS 425 may access or handover to a macrocell 410, while slower speed AMS 425 may prefer to access a non-macrocell 420. Access to the cells can be based on flexible and extendable type identifications to indicate cell types using one or more PHY identifiers and/or MAC identifiers. For example, PHY identifiers may be defined through designations of PHY preamble codes for each type of base station. MAC identifiers may be included in MAC messages. In an embodiment, an identification of the MAC layer 159 is performed by including a cell type parameter in a broadcast control channel of a serving base station, such as the macro ABS 405 or the non-macro ABS 415. Also, identification of the MAC layer 159 may be enabled by including the cell type for neighboring base stations in a neighbor advertisement message (MOB_NBR-ADV message). For further overhead reduction, a parameter indicating cell types for neighboring base stations may be sent only if the neighbor base station's type is different than the serving base station.

The PHY 156 layer, as described earlier in reference to FIG. 2, uses two types of advanced preambles: a primary advanced preamble (PA-preamble) and a secondary advanced preamble (SA-preamble). One PA-preamble symbol and three SA-preamble symbols exist within a superframe. A non-macro ABS 415, or femto ABS in an embodiment, may be identified in a SA-preamble partition of a preamble code space. Identification of macro ABS 405 and/or non-macro ABS 415 types may be accomplished by dividing preamble sequences into multiple groups; one for each base station type. The groups or preamble partitions may be predefined and/or programmed into the AMS 425 upon provisioning. Alternately or in combination, the partitioning may also be defined flexibly by signaling in a broadcast control channel or superframe header (SFH). A feedback channel (BCH) may include information about how preamble sequences for primary or secondary preambles are partitioned across available cell-types, including cell types other than a serving cell type. The partitions may be defined network wide so that an AMS 425 that reads a BCH from a first selected carrier can determine if the first selected carrier is viable or available for access. The AMS 425 may also determine one or more subset of preambles the AMS 425 should locate in a search for alternate carriers.

In an embodiment, three carrier sets are available in the SA-preamble resulting in 3×256 available sequences. In this embodiment, the sequences are partitioned initially through a short information element in the SFH between two types of base stations as either the macro ABS 405 or the non-macro ABS 415. The partitioning may also be performed using a hard partition to categorize base station types as either a macro ABS 405 or a non-macro ABS 415. Additional bits in the SFH may be used to define flexible or soft partitioning for non-macro cells 420 to further stratify various types of non-macro cells 420. For example, the non-macro ABS 415 may be partitioned into public femto OSG cells or a femto ABS serving CSGs, wherein each ABS is a CSG Closed Femto ABS and/or a CSG Open Femto ABS.

Two or more methods of encoding in the SFH may be used to identify femtocells. As a first example, a triplet index represented as [Private, Semi-Private, Public] may correlate to [CSG Closed, CSG Open, OSG] femtocells. In the example, an index of bits [0,1,1] would indicate that no Private cells are available in the multi-layer network 400. Partitioning may be established as a default for all types of macrocells 410 and non-macrocells 420. Further, a flag may be established to indicate if otherwise and if more than one type of cell is present. In this example, if the flag is set to 1, the SFH will also include information about unequal partitioning. The information may be coded as [p1,p2], however the embodiment is not so limited.

In another embodiment wherein encoding is used to identify femtocells in the SFH, a triplet index represented as [Private, Semi-Private, Public] wherein two bits (or doublet) are used for representation [(a1,a2), (b1,b2), (c1,c2)] and each doublet is the weighting factor for the corresponding femtocell type. In an embodiment, a number of preamble codes reserved for a Private cell type is calculated as:

$$N_{Private} = \frac{(a1, a2)}{(a1, a2) + (b1, b2) + (c1, c2)},$$

and;

| | (a1, a2), (b1, b2), (c1, c2) |
|---|---|
| 00 | 0 (this type not present) |
| 01 | 1 |
| 10 | 2 |
| 11 | 4 |

As a third example, where n=bits as an index to a table of 2n possible combination of types and partitions for SA-preamble sequences;

| Codes | Private (CSG Closed) | Semi-Private (CSG Open) | Public (OSG) |
|---|---|---|---|
| 0000 | 0 | 0 | 1 |
| 0001 | 0 | 1/4 | 3/4 |
| 0010 | 0 | 3/4 | 1/4 |
| 0011 | 0 | 1/2 | 1/2 |
| 0100 | 0 | 1 | 0 |
| 0101 | 1/4 | 0 | 3/4 |
| 0110 | 3/4 | 0 | 1/4 |
| 0111 | 1/2 | 0 | 1/2 |
| 1000 | 1 | 0 | 0 |
| 1001 | 1/4 | 3/4 | 0 |
| 1010 | 3/4 | 1/4 | 0 |
| 1011 | 1/2 | 1/2 | 0 |
| 1100 | 1/4 | 3/4 | 0 |
| 1101 | 1/2 | 1/4 | 1/4 |
| 1110 | 1/4 | 1/4 | 1/2 |
| 1111 | 1/3 | 1/3 | 1/3 |

In a fourth example, an equal number of sequences may be reserved for each cell type, as indicated by setting 1 in a bit map on the SFH.

Cell types such as the macrocell 410 and the non-macrocell 420 may also be identified using a mechanism such as a reserved bit to show if a base station such as the macro ABS 405 and the non-macro ABS 415 is synchronized with the multi-layer network 400. For example, if the AMS 425 associates with a femto ABS of a non-macrocell 420 and finds that the femto ABS is not synchronized with the multi-layer network 400, the AMS 425 may apply a wider search window when searching or scanning for base stations in the multi-layer network 400.

The mechanism indicating whether the base station is synchronized with the multi-layer network 400 may be applied at the PHY 156 and/or the MAC 159 layer. For example, preamble indexes for each type of non-macrocell 420 may be partitioned as a function of non-macrocell type and synchronization status, such as a synchronized or not-synchronized OSG Femto ABS, CSG Closed Femto ABS, or CSG Open Femto ABS. In an embodiment, an AMS 425 may determine that a base station is not synchronized with the multi-layer network 400 and expand its search window for scanning of corresponding preambles received from one or more macro ABS 405 and/or non-macro ABS 415.

The IEEE 802.16 standard defines an optional parameter called "cell type" for the neighbor advertisement message (MOB_NBR-ADV message), also referred to as the DCD message. The optional parameter may be used to enable preferred and/or restricted access to a cell. The PHY identifier, as described by the examples provided herein, allows prompt indication to the AMS 425 if the AMS 425 should skip a base station and look for alternative base stations. This allows the AMS 425 to conduct faster scanning and cell selection in a multi-layer network 400. In addition, hard and/or soft partitioning provides maximum flexibility and availability of preamble codes needed for identification of base station types.

Entry to a multi-layer network 400 may comprise scanning for RF carriers and conducting cell selection for either a macrocell 410 or a non-macrocell 420. The AMS 425 may scan according to a preferred channel list for each frequency spectrum, if available and provisioned in the AMS 425. In an embodiment, within each RF channel, the AMS 425 scans for preambles such as the PA-preamble and SA-preambles and checks for base station types using parameters in a sleep control header (SCH), a physical broadcast channel (PBCH), or other relevant broadcast information available to the AMS 425. Selection of one or more cells may be prioritized using pre-defined rules relating to preferred access and restricted access.

For preferred access, if the AMS 425 belongs to a CSG of any femtocell, the AMS 425 should first scan for preferred base stations relating to frequencies, preamble sequences, and base station identification (BSID) provisioned in the AMS 425 for its preferred or restricted access. The AMS 425 should continue network entry with a base station if the AMS 425 cannot be served by neighboring macrocells 410 or non-macrocells 420, such as an OSG femto advanced base station (ABS). The AMS 425 should access one of the non-macro ABSs 415 offering service to a CSG femtocell to which the AMS 425 is a member according to coverage and service requirements. The AMS 425 may select another base station only if it can not find a non-macro ABS 415 in a private network of the AMS 425, such as a CSG Closed Femto. For example, the AMS 425 belonging to a CSG of a home femtocell base station should look for a frequency and preamble used in the home femtocell base station before looking for alternate base stations.

An AMS 425 that is not part of a CSG of a private BS, or CSG-Closed femtocell ABS in this embodiment, should not attempt access or handover to that private BS. The AMS 425 should also avoid accessing a semi-private BS, or CSG-Open femtocell ABS in this embodiment unless there is no other public base station available or if the AMS 425 needs access to emergency services subject to regulation requirements.

A base station, such as the macro ABS 405 and/or the non-macro ABS 415 such as a Femto ABS may broadcast system information on neighboring base stations on a periodic basis using a neighbor advertisement message. In one embodiment, the advertisement message is an MOB NBR-ADV or a DCD message. In another embodiment, the advertisement message is an enhanced or E-NBR-ADV message. The advertisement message broadcasted by the base station includes information regarding types and/or parameters of neighboring base stations such as the macro ABS 405 and non-macro ABS 415 and may include information on neighboring CSG Open Femto ABSs and open subscriber group base stations. In another embodiment, advertisement messages that omit base station types for one or more neighboring base stations implies that the one or more neighboring base stations are the same type as the serving base station.

An AMS 425 that associates with a public or open subscriber group base station, such as the macro ABS 405 or non-macro ABS 415 including a femto ABS, may receive a list of accessible neighboring femto ABSs through unicast messaging. The accessible femto ABS list may contain CSG-closed femto ABSs serving closed subscriber groups that the AMS 425 belongs to, along with CSG Open Femto ABSs. In another embodiment, the serving femto ABS may command the AMS 425 to scan for CSG Closed Femto ABSs that are accessible to the AMS 425.

In an embodiment where the AMS 425 is subject to restricted handover and the AMS 425 is not a member of a CSG Closed Femto, the AMS 425 should not scan for a CSG Closed Femto and only scan for a public base station such as a macro ABS 405 or a non-macro ABS 415 configured as an OSG Femto ABS. The AMS 425 may also scan for a non-macro ABS 415 configured as a CSG Open Femto ABS if the AMS 425 is unable to find a suitable public base station. The AMS 425 should only attempt handover in a connected mode or network re-entry in an idle mode to a private base station such as a CSG Closed Femto if the AMS 425 is a member of the CSG closed Femto.

In an embodiment where the AMS 425 is subject to preferred handover, such as where the AMS 425 is a member of a non-macro ABS 415 including one or more CSG Closed Femtos and/or CSG Open Femtos, then the AMS 425 should first scan for the non-macro ABSs that the AMS 425 is a member of, particularly if those non-macro ABSs are present in a neighbor advertisement message. The AMS 425 can then scan for public base stations such as the macro ABS 405 or an OSG Femto if the AMS 425 is unable to find a suitable CSG Closed Femto or CSG Open Femto. The AMS 425 can request preferred handover or attempt network re-entry to a CSG Closed Femto or CSG Open Femto, if such an ABS is available and sufficient for service. The AMS 425 may request handover to reenter the network through a public base station if necessary. In an embodiment, an AMS 425 that is served by a private base station such as a CSG Closed Femto should not request handover to a base station outside the AMS's 425 private network unless there is no coverage available from the AMS's 425 private base stations.

Upon provisioning of the AMS 425, wherein the AMS 425 is added to a CSG Closed Femto network, a list of base station identifiers (BSIDs) of that private base station network and any corresponding neighboring public base stations such as the macro ABS 405 may be stored and updated in the private network at the CSG Closed Femto ABSs and/or in the AMS 425. In an embodiment, if the AMS 425 is in one of the macrocells 410 that neighbors one of its CSG Closed Femto ABSs, even if the CSG Closed Femto ABS is not listed in a neighbor advertisement message of the macro ABS 405, the AMS 425 may trigger scanning and reporting of measurements for nearby CSG non-macro ABSs 415 to the serving macro ABS 405. If the AMS 425 that is a member of a CSG network is in a connected mode in a nearby macro ABS 405, the macro ABS 405 may command the AMS 425 to scan for CSG closed Femto ABSs that are accessible to the AMS 425.

Figure 5:
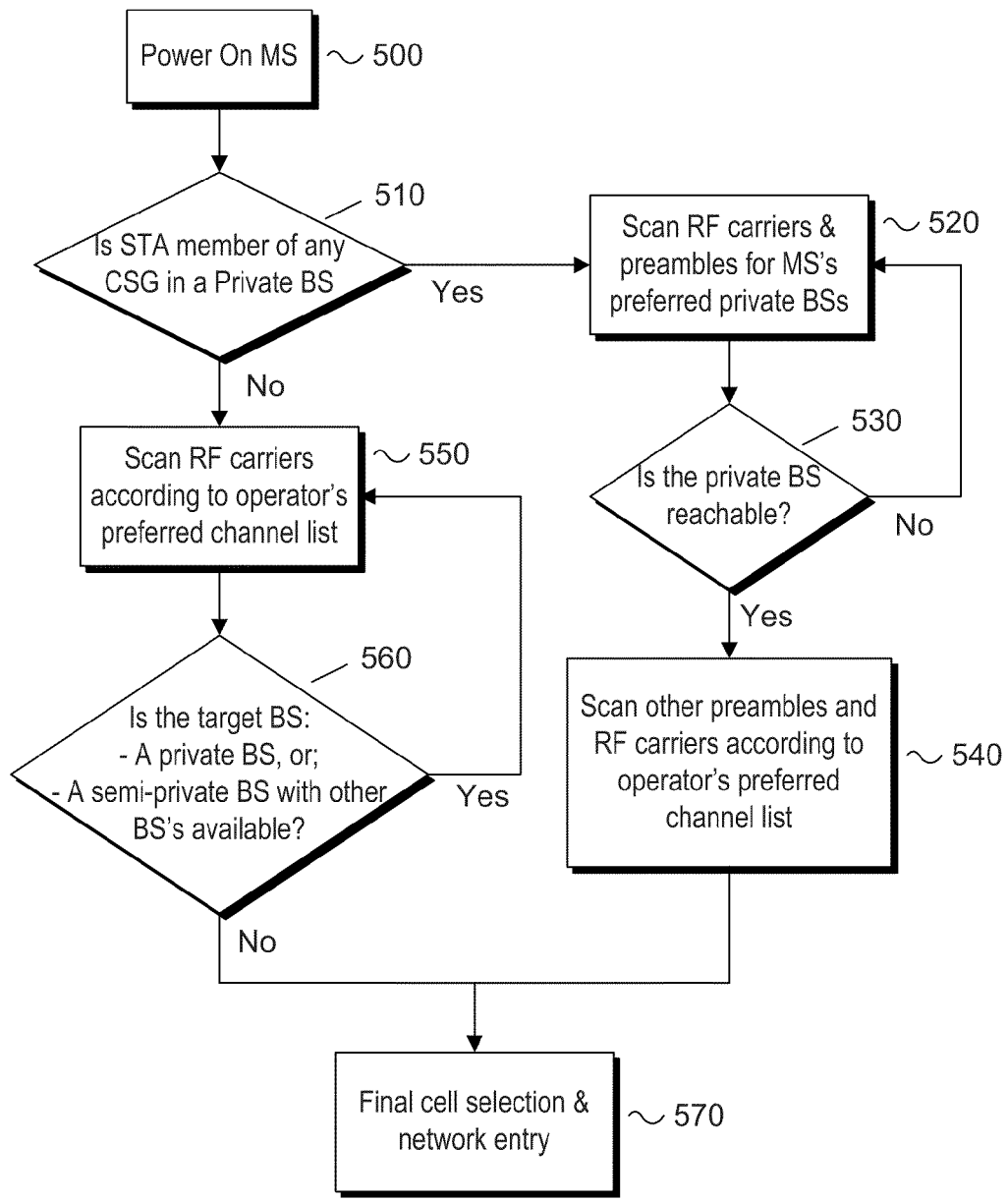
FIG. 5 is a flowchart for network entry according to some embodiments.

FIG. 5 is a flowchart for network entry and cell selection according to some embodiments. An apparatus 130 such as the AMS 425 is powered on in a multi-layer network 400 comprising one or more macrocells 410 and/or non-macrocells 420 in element 500. The AMS 425 identifies the one or more macrocells 410 and/or non-macrocells 420 in the multi-layer network 400 and determines whether the AMS 425 is a member of a closed subscriber group (CSG) in a private base station such as a CSG Closed Femto in element 510. If the AMS 425 is a member of a CSG, the AMS 425 scans available RF carriers and preambles for a preferred private base station in element 520. The AMS 425 determines if the preferred private base station may be reached by the AMS 425 in element 530. If the preferred private base station can be reached by the AMS 425, then the AMS 425 scans other RF carriers and preambles according to an operator's preferred channel list in element 540. In an embodiment, the preferred channel list may be provisioned on the AMS 540 either by the manufacturer or later, such as by a network provider.

If the AMS 425 is not a member of a CSG, the AMS 425 scans RF carriers for one or more target base stations in element 550 according to the operator's preferred channel list if a preferred channel list is provisioned in the AMS 425. The AMS 425 determines if the one or more target base stations is a private base station such as the CSG Closed Femto, a semi-private base station such as a CSG Open Femto, or if other base station types are available such as an OSG Femto in element 560. The AMS 425 may determine a type of base station in element 560 using a preamble sequence, a base station type in a feedback channel (BCH), a neighbor advertisement message (MOB_NBR-ADV message) or DCD message, such as in a legacy system when the AMS 425 is in an idle mode. The AMS 425 performs final cell selection and network entry to the multi-layer network 400 in element 570.

Figure 6:
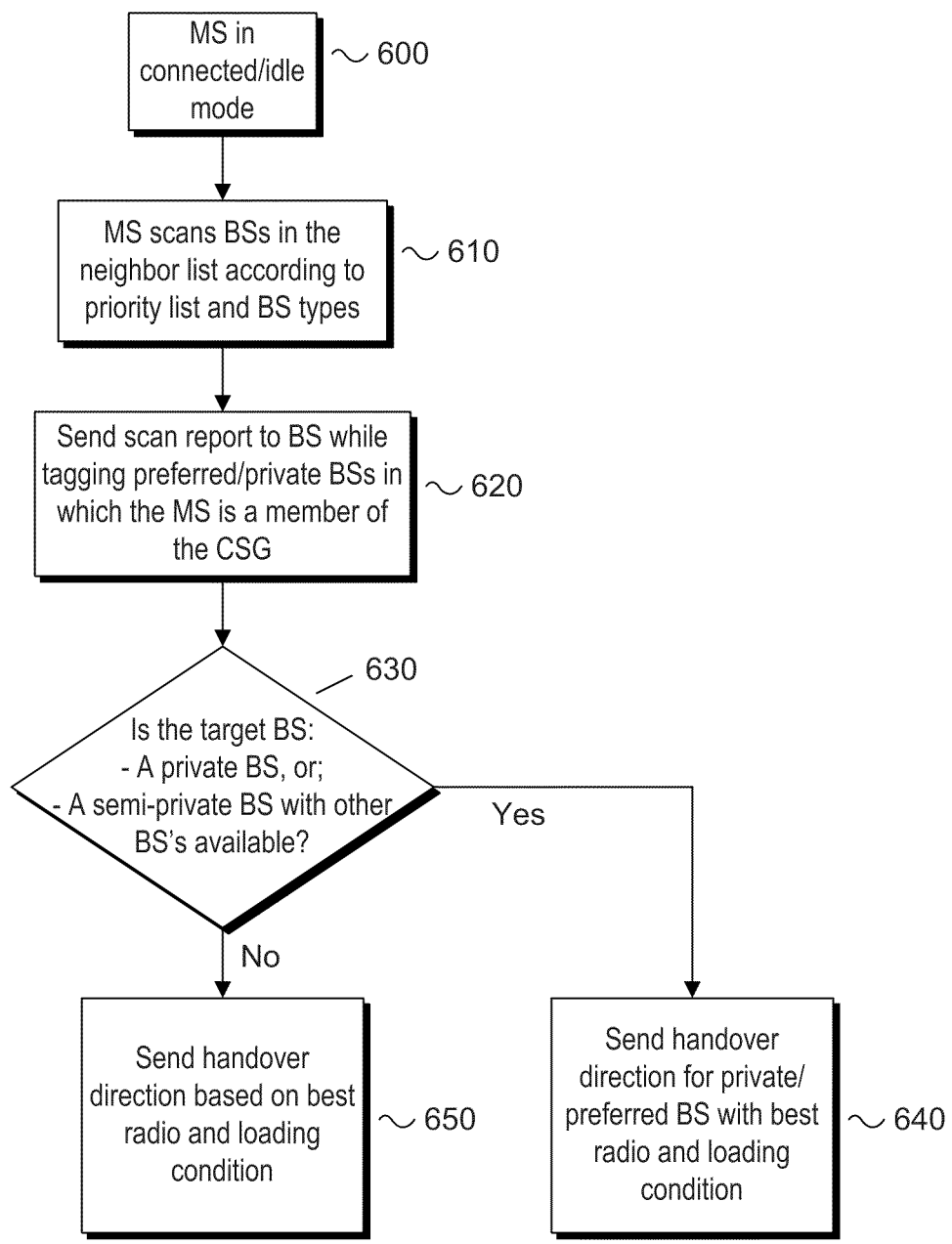
FIG. 6 is another flowchart for network entry according to some embodiments.

FIG. 6 is another flowchart for network entry and cell selection according to some embodiments. The AMS 425 is in a connected or idle mode in element 600 and scans available base stations in a neighbor list, which may be provisioned in the AMS 425 or derived from a neighbor advertisement message, according to priority and base station type in element 610 and generates a scan report. The AMS 425 sends the scan report to a base station in element 620 while tagging preferred and/or private base stations in which the AMS 425 is a member of a CSG. The AMS 425 determines whether any of the preferred and/or private base stations are reachable or available to the AMS 425 in element 630. If the preferred and/or private base stations are reachable or available, then handover directions are sent for one or more preferred and/or private base stations in element 640 based on at least one of a channel parameter and loading conditions. If the preferred and/or private base stations are not reachable or available, then handover directions are sent in element 650 based on at least one of a channel parameter and loading conditions.

The operation discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

What is claimed is:

1. A method for accessing a multi-layer network, comprising:
    associating an advanced mobile station (AMS) with a first advanced base station (ABS) in the multi-layer network;
    receiving a neighbor advertisement message, wherein the neighbor advertisement message lists ABSs according to a priority of each ABS within the neighbor advertisement message, and according to an ABS type of each ABS within the neighbor advertisement message, wherein the ABS type includes a private closed subscriber group (CSG) Closed Femto ABS type or a semi-private CSG Open Femto ABS type;

identifying ABSs in the neighbor advertisement message that are associated with the AMS, wherein the AMS is a member of a CSG for ABSs configured to associate with the AMS, and wherein an ABS in the identified ABSs is a private CSG Closed Femto ABS or a semi-private CSG Open Femto ABS;

locating a non-macro ABS in the identified ABSs from the neighbor advertisement message; and handing over from the first ABS to the located non-macro ABS based on at least one of a channel parameter and loading conditions.

2. The method of claim 1, wherein the ABS type is determined by at least one of cell size, access type, and network synchronization status.

3. The method of claim 1, wherein the neighbor advertisement message is a MOB_NBR-ADV message.

4. The method of claim 3, wherein the neighbor advertisement message comprises cell types of neighboring base stations.

5. The method of claim 1, wherein the first ABS is a public base station that supports an advanced air interface protocol.

6. The method of claim 1, further including identifying the ABS type using a preamble sequence.

7. A method for accessing a multi-layer network, comprising:

initializing an advanced mobile station (AMS) in the multi-layer network;

determining if the AMS is a member of a closed subscriber group (CSG);

scanning a first radio frequency (RF) carrier and a first RF carrier physical layer preamble of a physical layer frame and locating, at least in part from the first RF carrier physical layer preamble, a CSG Closed Femto advanced base station (ABS) that provides service to a CSG Closed Femto cell;

locating the CSG Closed Femto ABS;

determining if the CSG Closed Femto ABS provides service to the AMS;

locating a preferred channel list for the AMS, wherein the preferred channel list identifies one or more additional CSG Closed Femto ABSs associated with the AMS, wherein the additional CSG Closed Femto ABSs provide service to additional CSG Closed Femto cells;

identifying a second RF carrier on the preferred channel list; and accessing the multi-layer network through the CSG Closed Femto cell or at least one of the additional CSG Closed Femto cells.

8. The method of claim 7, wherein the preferred channel list is provisioned in the AMS.

9. The method of claim 7, wherein the AMS is subject to preferred handover and the AMS is a member of at least one of the CSG Closed Femto ABSs.

10. The method of claim 7, wherein the preferred channel list is derived from a neighbor advertisement message.

11. The method of claim 7, further including scanning for a public base station.

12. A method for accessing a multi-layer network using an advanced mobile station (AMS), comprising:

receiving a superframe from a base station comprising a primary advanced preamble (PA-Preamble) and a secondary advanced preamble (SA-preamble);

reading the SA-preamble of the superframe to identify first and second predefined hard partitions in the SA-preamble, wherein the first predefined hard partition indicates the base station is a macro advanced base station (ABS) and the second predefined hard partition indicates the base station is a non-macro ABS;

determining that the SA-preamble is from the non-macro ABS;

reading the superframe to locate a superframe header (SFH), wherein the SFH identifies the non-macro ABS by partition as a closed subscriber group (CSG) Femto ABS;

determining whether the AMS is a member of the CSG Femto ABS, wherein a list of CSG Femto base stations is provisioned in the AMS;

associating with the CSG Femto ABS if the AMS is a member of the CSG Femto ABS; and associating with another ABS if the AMS is not a member of the CSG Femto ABS.

13. The method of claim 12, further including receiving a neighbor advertisement message through a broadcast from a Femto ABS.

14. The method of claim 13, wherein the neighbor advertisement message lists a neighboring macro ABS.

15. The method of claim 13, wherein the Femto ABS commands the AMS to scan for CSG Closed Femto ABSs accessible to the AMS.

16. The method of claim 12, further including receiving a list of accessible neighboring Femto ABSs through unicast messaging.

17. The method of claim 16, wherein the list comprises CSG Closed Femto ABSs and CSG Open Femto ABSs.

18. An article comprising a non-transitory storage medium having stored thereon instructions that, when executed by a computing platform, results in:

associating an advanced mobile station (AMS) with a first advanced base station (ABS);

receiving a neighbor advertisement message, wherein the neighbor advertisement message lists ABSs according to a priority of each ABS within the neighbor advertisement message, and according to ABS type of each ABS within the neighbor advertisement message, wherein the ABS type includes a private closed subscriber group (CSG) Closed Femto ABS type or a semi-private CSG Open Femto ABS type;

identifying ABSs in the neighbor advertisement message that are associated with the AMS, wherein the AMS is a member of a closed subscriber group (CSG) for ABSs that are associate with the AMS, and wherein an ABS in the identified ABSs is a private CSG Closed Femto ABS or a semi-private CSG Open Femto ABS;

locating a non-macro ABS in the identified ABSs from the neighbor advertisement message; and handing over from the first ABS to a second ABS based on at least one of a channel parameter and loading conditions.

19. The article of claim 18, wherein the ABS type is determined by at least one of cell size, access type, and network synchronization status.

20. The article of claim 18, wherein the first ABS is a public base station that supports an advanced air interface protocol.

* * * * *